(12) United States Patent
Girard et al.

(10) Patent No.: US 7,007,304 B1
(45) Date of Patent: Feb. 28, 2006

(54) METHOD AND APPARATUS TO IMPROVE THE PROTECTION OF INFORMATION PRESENTED BY A COMPUTER

(75) Inventors: Luke E. Girard, Santa Clara, CA (US); Steven G. Preston, San Jose, CA (US); Daniel J. Lenehan, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 870 days.

(21) Appl. No.: 09/665,826

(22) Filed: Sep. 20, 2000

(51) Int. Cl.
*H04L 9/00* (2006.01)
(52) U.S. Cl. ...................................................... 726/30
(58) Field of Classification Search ................ 713/189, 713/193, 194, 200–202; 705/50–52, 57, 705/59; 345/700, 733, 741; 715/700, 733, 715/741
See application file for complete search history.

(56) References Cited

U.S. PATENT DOCUMENTS

| | | | | |
|---|---|---|---|---|
| 4,862,156 A | * | 8/1989 | Westberg et al. | 345/440 |
| 5,675,321 A | * | 10/1997 | McBride | 340/568.2 |
| 5,881,287 A | | 3/1999 | Mast | |
| 5,928,361 A | * | 7/1999 | Nishimura | 713/200 |
| 6,011,473 A | * | 1/2000 | Klein | 340/571 |
| 6,167,519 A | * | 12/2000 | Sonobe | 713/200 |
| 6,209,103 B1 | * | 3/2001 | Schreiber et al. | 713/201 |
| 6,298,446 B1 | * | 10/2001 | Schreiber et al. | 713/201 |
| 6,353,892 B1 | * | 3/2002 | Schreiber et al. | 713/201 |
| 6,731,756 B1 | * | 5/2004 | Pizano et al. | 380/201 |
| 2003/0005295 A1 | * | 1/2003 | Girard | 713/167 |

FOREIGN PATENT DOCUMENTS

| | | |
|---|---|---|
| JP | 01 110295 | 4/1989 |
| WO | 02/25416 A2 * | 2/2002 |

OTHER PUBLICATIONS

"SafeImage 1.34 Installation and Users Guide" Jun. 3, 1999, www.safemedia.com, p. 1-10.*
Webopedia, Definition of the word "browser", http://www.pcwebopaedia.com, Sep. 15, 2004, pp. 1 total.
Ron White, "How Computers Work", Millennium Edition, part 7, chapter 41, http://www.howcomputerswork.net/index.html, 1999, pp. 5 total.

* cited by examiner

*Primary Examiner*—Christopher Revak
(74) *Attorney, Agent, or Firm*—Blakely, Sokoloff, Taylor & Zafman LLP

(57) ABSTRACT

An improvement to a graphics controller to prevent the contents of selected portions of the frame buffer from being read by devices external to the graphics controller. The invention defines one or more viewable rectangles in the frame buffer as a protected write-only area. Any attempt to read data from the protected area of the frame buffer triggers a security violation which can delete or destroy the contents of that area to prevent it from being read. The controller can also operate in a bypass mode in which the security functions are bypassed so the graphics controller operates in a conventional manner. A security violation may return the controller to the bypass mode. The invention can prevent protected data, such as copyrighted data downloaded over the Internet, from being copied from the frame buffer and used in an unauthorized manner.

22 Claims, 5 Drawing Sheets

METHOD AND APPARATUS TO IMPROVE THE PROTECTION OF INFORMATION PRESENTED BY A COMPUTER

BACKGROUND OF THE INVENTION

1. Field of the Invention

The invention pertains generally to computer security. In particular, it pertains to protecting electronic documents on a computer from unauthorized copying or other harmful intervention.

2. Description of the Related Art

Widespread use of the Internet and email has left millions of personal computers (PCs) vulnerable to downloaded viruses and other types of malicious software that can destroy programs, copy and upload private documents, and perform other harmful acts, frequently without the PC operator's knowledge. The increasing popularity of downloaded programs has multiplied the problem significantly, since it creates so many more opportunities to unknowingly download the malicious software. Due to their open architecture, most PCs provide very little protection against such destructive software. It is this very openness that has made the PC platform the general-purpose solution provider that it is. Other types of computers are also vulnerable to such attacks in varying degrees, but the pervasive use of PCs has drawn much attention to the problem as it applies to PCs.

In the past, owners of copyrighted information or other intellectual property have been reluctant to allow their property to be viewed on the PC platform (books, movies, sensitive corporate documents, etc.) as the nature of the open PC platform makes the property vulnerable to mischievous software that may be running in parallel. Although self-replicating destructive software (viruses) attracts the most attention, copyright owners are more concerned with the illegal copying and distribution of any document that they permit to be downloaded to a computer. This is particularly true of e-books, or books that are available electronically by downloading the text of those books over a network such as the Internet. The ease of copying documents downloaded into a PC makes it easy to illicitly reproduce and forward copyrighted materials without detection of this activity by the copyright owner.

FIG. 1 shows a conventional system 10. Protected content in the form of encrypted data is provided over channel 11 to storage subsystem 12, where it is stored for subsequent use. Channel 11 could be an Internet connection and the portion of a PC that receives and processes network data. Storage subsystem 12 could be main memory, the hard disk on the PC, or some other form of storage. When the data is ready for presentation, it can be retrieved from storage 12 and presented to player 14 for processing. Player 14 is generally software running in the PC. Decryption of the encrypted data can take place in player 14, which can also reformat the data. The processed data can then be passed over channel 15 to graphics sub-system 16, where it is formatted for presentation over channel 17 to the actual display device, such as a video monitor. Note: although the terms "document" and "display" are used here, this scenario applies equally well to graphics video data and to audio data, such as music, that is played through speakers.

FIG. 2 shows a conventional graphics controller 16. Previous attempts to protect downloaded data have focused primarily on encrypting the data for delivery and storage. However, once the data is decrypted, formatted, and sent to the graphics controller 16 through primary interface 21, the bit-image of that data is generally placed in a video memory 22 where the data is repeatedly read out and transmitted through output port 23 to a display device. For reasons of flexibility and usability, the contents of video memory 16 can generally be read through primary interface 21 by the PC that implements player 14, and may be read by other devices as well through that same interface. Many graphics controllers also have a secondary interface 24 that also permits both read and write capability of video memory 22 by other devices, as well as permitting direct transmission of video data to output port 23 when that capability is needed. Output port 23 generally does not provide memory read capability. However, interfaces 21 and 24 provide two ports through which the data in video memory 22 can be captured, and subsequently saved and/or transmitted, for later display in an unauthorized manner. For efficiency of transmission, the offending software that captures the bit-image from video memory can also use the text font maps stored in the PC to interpret the bit image and convert any displayable text back to a standard word processing format. Thus, by using resources freely available in the PC, the supposedly protected data in graphics controller 16 can not only be retrieved and stored and/or transmitted to another device, but the retrieved data can be reverse-engineered into a much more compact and usable form before such storage/transmission.

Since many players are in the form of a PC that is vulnerable to modification by maliciously loaded software, this exposure of the graphics subsystem creates a security problem that discourages the use of PCs for any displayable data that needs to be protected, such as copyrighted video material. Once the data is placed in graphics subsystem 16, that data is vulnerable to unauthorized monitoring and capture by software that has been illicitly placed in the computer.

It is not only downloaded malicious software that can compromise the security of the data. The PC operator might wish to illicitly copy the data, which he or she legitimately downloaded, for subsequent illicit use or distribution.

SUMMARY OF THE INVENTION

An embodiment of the invention includes a method that includes receiving data in a presentation buffer of a presentation controller, and receiving a request from a requestor to read the data in the presentation buffer. It further includes deleting the data from the presentation buffer in response to the request and not delivering the data to the requestor in response to the request.

DETAILED DESCRIPTION OF THE INVENTION

When electronic documents are downloaded from a publisher/owner to a computer for display, unauthorized copying, diversion, modification, destruction, or other harmful effects to that data can take place at several points. The data needs to be protected from those harmful effects during delivery to the player, inside the player, outside the player, and at the display. This invention focuses on protecting the data in the graphics subsystem, and can include elements in the player to implement that protection.

Figure 1:
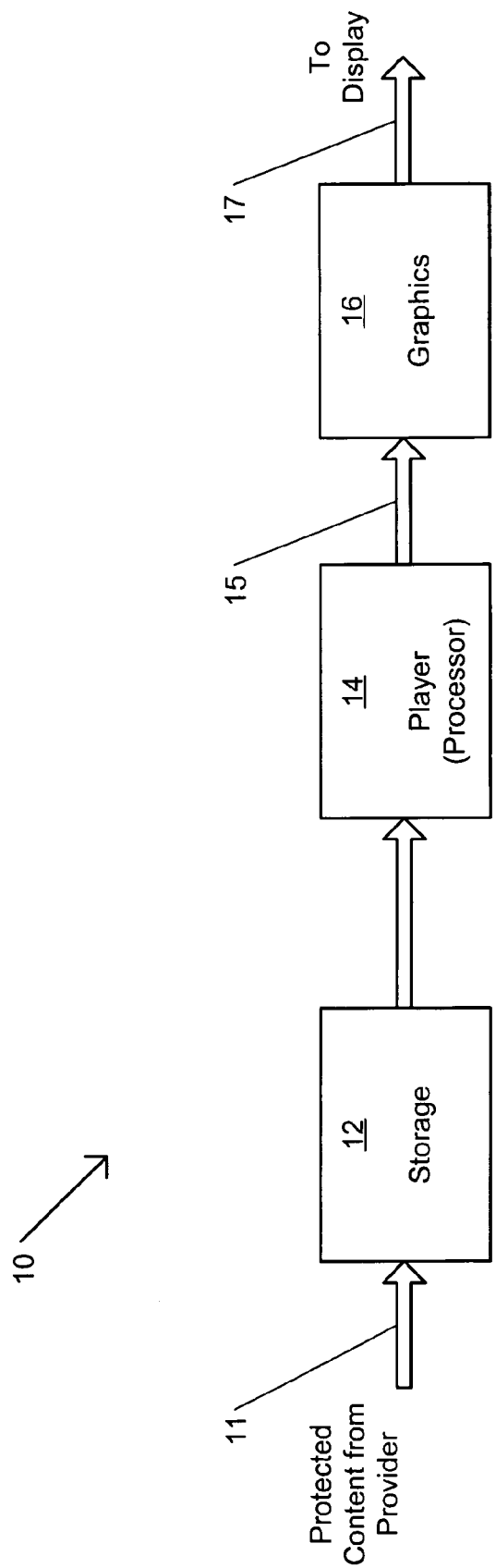
FIG. 1 shows a prior art system.
Figure 2:
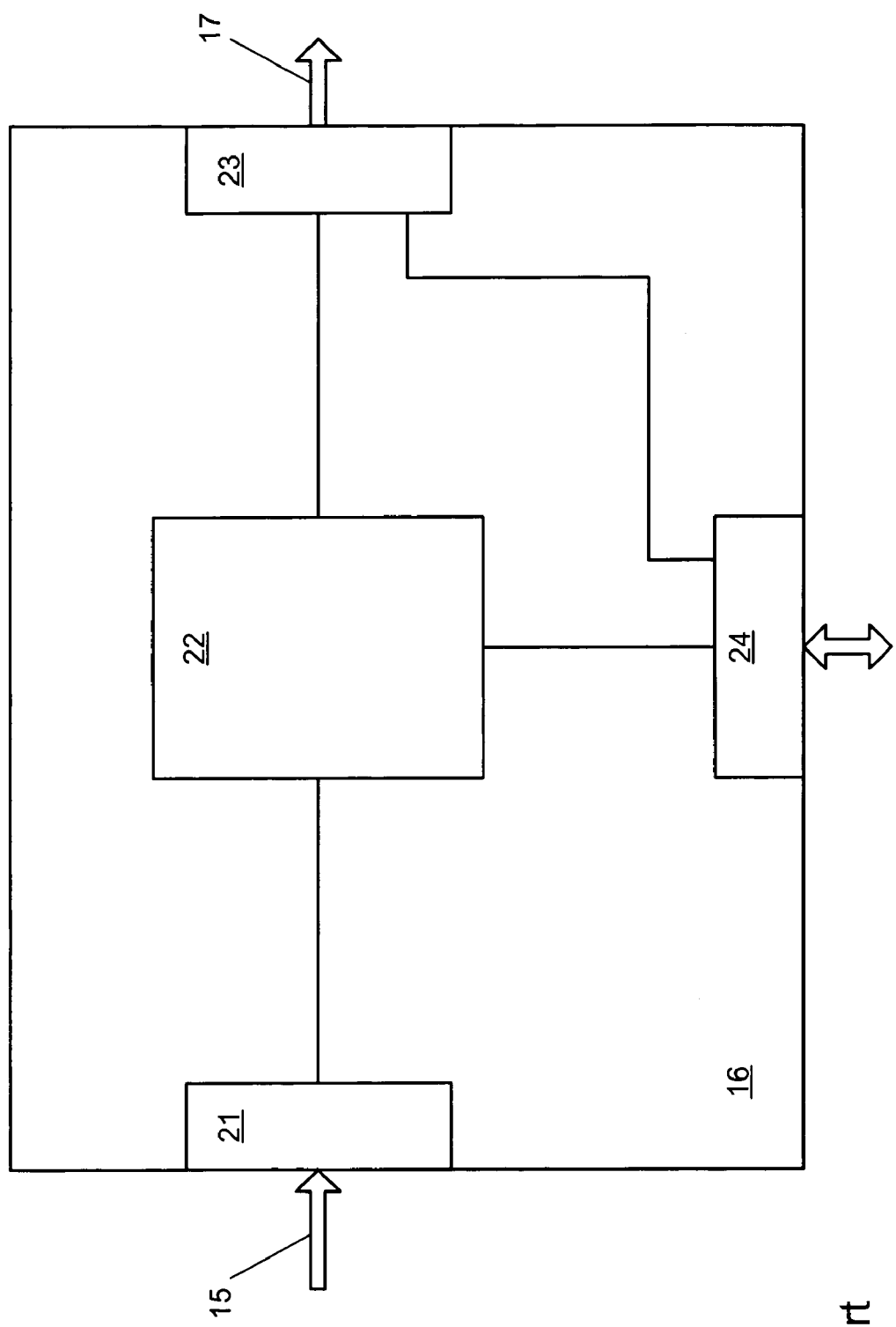
FIG. 2 shows a prior art graphics controller.
Figure 3:
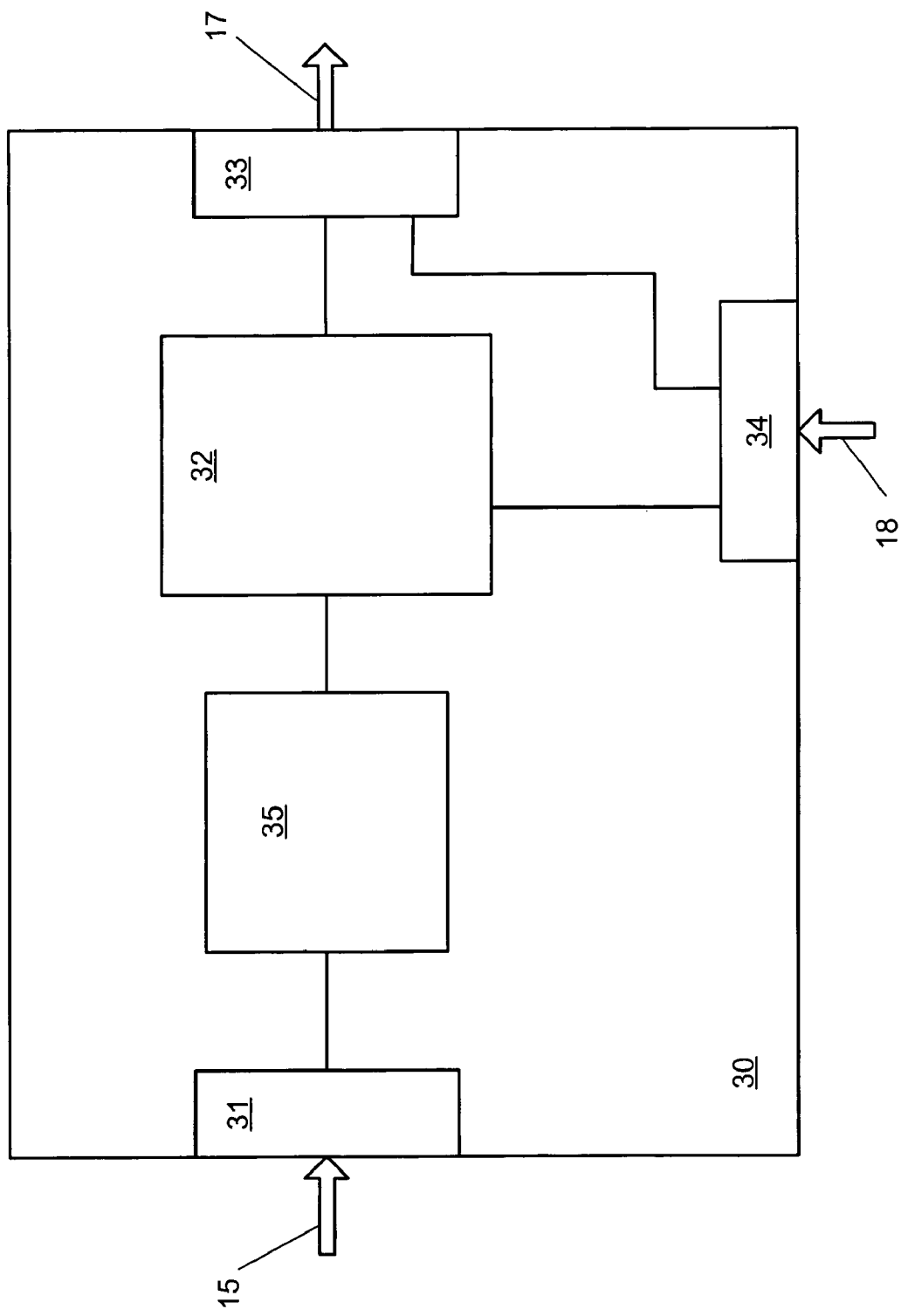
FIG. 3 shows a graphics controller of the invention.

FIG. 3 shows a graphics controller 30 of the invention. Rendered data from the player can be received through primary interface 31 for subsequent storage in video memory 32. Memory 32 includes a frame buffer for storing the portion of the stored image that is actually displayed. Data from the frame buffer can then be sent to an output interface 33, which sends a properly formatted signal to the display device. Output interface 33 can include a random access memory digital-to-analog converter (RAMDAC), which converts the digitized data into one or more properly formatted analog signals with the specified color rendition. Other types of display devices might require a different output interface to format the data in a different manner, but the overall process within graphics controller 30 is basically the same. A secondary interface 34 can also provide a secondary port to a data channel 18 for data destined for video memory 32, or provide video data directly to output interface 33. Unlike a conventional graphics controller, however, graphics controller 30 can contain a control circuit 35 to monitor and/or control data flowing between video memory 32 and either of interfaces 31 or 34, and to control video memory 32 in a manner that protects secure data stored therein from being illicitly read by devices external to graphics controller 30. Thus control circuit 35 can act as a gatekeeper between video memory 32 and devices external to graphics controller 30.

The operation of control circuit 35 can be broken down into several functional areas: mode control, security setup, security violation detection, response to violation, and termination. These are described in more detail below:

Mode Control

Control circuit 35 (and therefore graphics controller 30) can have two modes: a security mode and a by-pass mode. In the by-pass mode, the security features of control circuit 35 are by-passed, and graphics controller 30 can effectively perform as a conventional graphics controller. In the security mode, control circuit 35 can perform security functions to prevent all or a portion of the contents of video memory 32 from being read through interface 31. If interface 34 has a read capability, control circuit 35 can also be coupled to interface 34 to prevent video memory 32 from being read through interface 34. The mode can be established by one or more commands from the computer controlling circuit 35. In one embodiment, mode commands, other commands, associated addresses and video data can all be input through interface 31 along with other commands and data to be written to video memory. In another embodiment, commands and addresses can be input through one or more separate interfaces (not shown). In one embodiment, the security mode can be entered simply with an external command, but the security mode can be exited only if the secure data is deleted first. This prevents illicit software from simply turning off the security mode so that the protected data can be read with impunity.

Security Setup

The display device in a conventional system frequently shows multiple windows at the same time, some of them overlapping others. Thus the frame buffer may contain multiple windows, or portions of windows, at any given time. Since all the displayed windows are in the frame buffer, and the frame buffer can be read by external devices in a conventional system, the displayed contents of any window are freely accessible to external devices in a conventional system.

When a copyrighted document or other secure data is being displayed, the window containing that secure data may be only one of several windows that are being simultaneously shown on various parts of the display device. Several of those windows may contain non-secure data that the operator wishes to handle in a standard manner. For example, while viewing portions of a secure copyrighted e-book in one window, the operator may wish to read e-mail or look up an appointment notebook in another window without having to exit from the e-book application. Therefore the protected portion of the data may be only a subset of the frame buffer, and the secure portion of the data should be defined separately from the remaining displayed data.

The invention can define the coordinates of a secure window within the frame buffer. These coordinates can be contained in a set of registers that define opposite corners of a rectangular displayed window, such as the upper left and lower right corners of that window. Any data that is located within this window is considered secure, and can be protected. In one embodiment, one or more sets of registers are dedicated to defining secure windows in this manner. In another embodiment, existing registers that define a window are temporarily designated as secure registers as long as the defined window contains secure data, but those registers can return to non-secure status once the secure data is automatically deleted and/or the window is closed. In both embodiments, multiple sets of registers can be used to define multiple secure windows, so that the security function can be performed simultaneously on different windows. Note: although the term 'registers' is used here, the invention can also use other forms of data storage to hold the coordinates of the secure windows, such a block of memory containing multiple memory locations. Such obvious design tradeoffs are within the capability of an average circuit designer.

Security registers can be loaded with the coordinates of the secure window by appropriate setup commands passed through interface 31. This assumes interface 31 supports conveyance of a combination of commands and data. Alternately, setup commands can be passed to control circuit 35 through another interface (not shown) specially designated for this purpose. In one embodiment, once these setup commands are entered, the designated security coordinates cannot be altered without deleting the protected data defined by these coordinates. This protects against malicious software that accesses the secure data simply by changing the coordinates of the protected area to another location.

Security Violation Detection

Regardless of the register configuration used, the data within the secure window can be treated as write-only data for all devices other than output circuit 33 which, by necessity, must read the contents of video memory so that it can display the image on a display device. All other devices, i.e., devices that can read video memory through interfaces 31, 34, or any other accessory ports, are prevented from reading any data in the window defined by the contents of the secure registers. Data in the frame buffer that is outside this defined security window can be read in the normal manner. This effectively prevents the pre-defined secure data in the frame buffer from being illicitly read, copied, or transmitted by malicious software, while not interfering with normal operations for the rest of the data in the frame buffer.

Detection of an attempted security violation can be accomplished by monitoring the addresses of any requests to read data from video memory 32. If the requested address falls between the two stored addresses that define the opposite corners of a protected window, then a violation has occurred. When multiple security windows are defined at the same time, a separate comparison can be made for each secure window. A violation of any secure window can trigger a response.

Response to Violation

The no-read function can be enforced in various ways. In one embodiment, when a device attempts to read data from the secure area defined by the security registers, a data protector in graphics controller 30 will return video data, but not the requested video data. The controller might return a solid color for all of the locations in the protected area (such as blue, black, white, etc.). The controller might also return random data, resulting in an image of static. Another option is to return a window with an warning message, alerting the operator to the fact that protected data has been requested.

A second embodiment provides greater protection. In this embodiment, any attempt to read data from the protected portion of video memory can result in purging the protected portion of the data by the data protector. This can be done by overwriting the protected data with other data, such as the solid color, random data, or error message described above. This step can be followed by exiting the secure mode, so that the requested window is available for reading, but the secure data is no longer in it. These actions can also trigger other defensive mechanisms, such alerting the operator, deleting the other secure data that is still stored in encrypted form on disk, or severing the connection to the remote source of the secure data. Such drastic actions can prevent alternate, repeated attacks on the secure data by removing the secure data from the system altogether.

Some computer systems, such as laptop PCs, provide an external connector on the graphics controller so that other display devices can be attached. Besides the previously described features, additional protection can be provided by disabling the external graphics connector when secure data is being displayed so that external equipment can't just record the signal.

Termination

When the need to display protected data is over, commands can be issued to control circuit 35 to delete the secure window and/or to change the mode of the affected window from security to by-pass. In either case, the protected data within that window can be purged from video memory first so that it cannot be subsequently read by external devices. One or more commands can be implemented that terminate the secure mode in this manner. Alternately, termination can be triggered by simply attempting a read of the protected data, thereby artificially forcing a termination in the manner described above under 'Response to Violation'.

Figure 4:
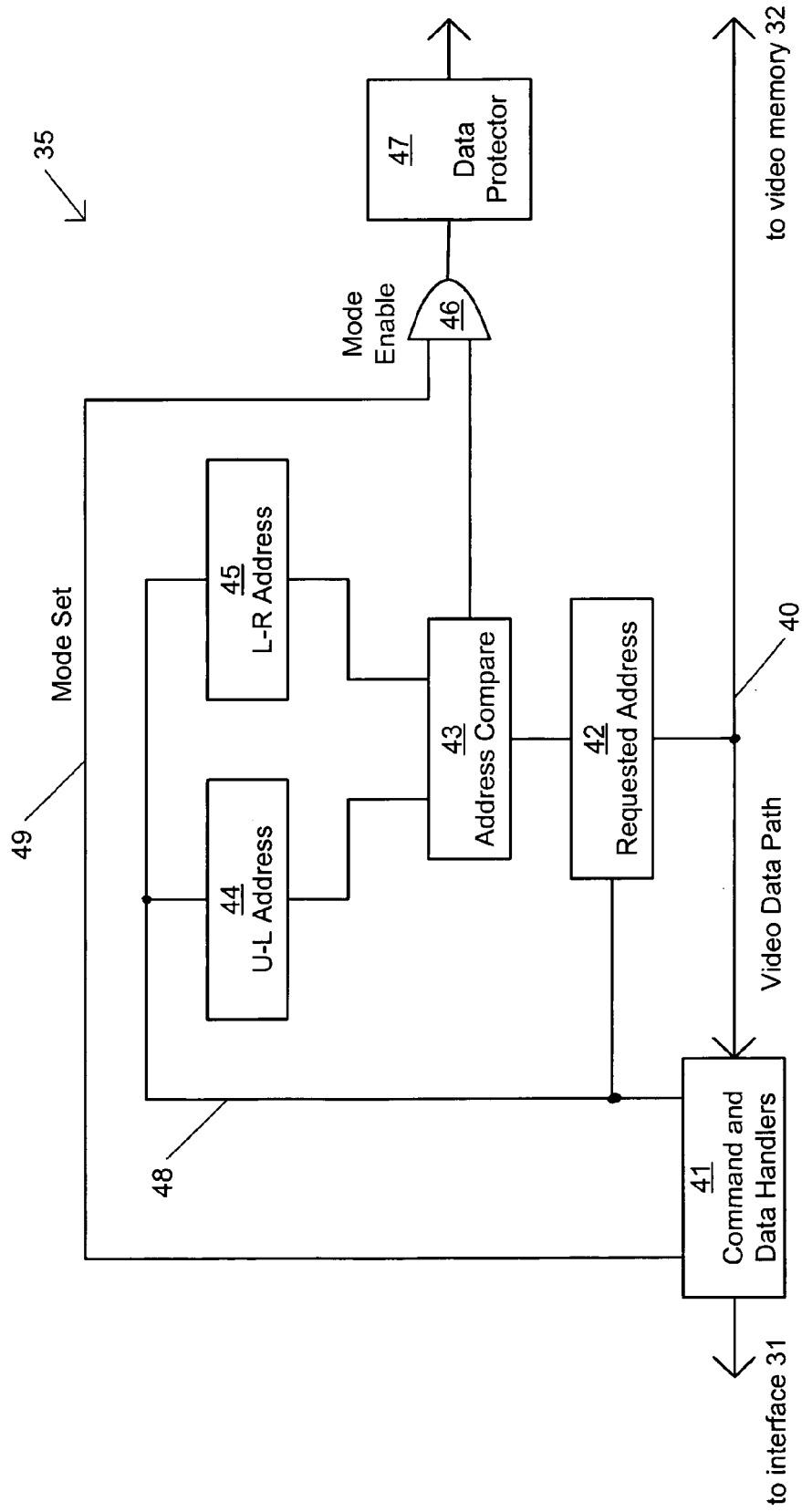
FIG. 4 shows a control circuit of the invention.

FIG. 4 shows a view of an embodiment of control circuit 35 in more detail. FIG. 4 is intended to show functional relationships rather than circuit connections, although a circuit can be modeled after the figure. Commands, addresses, and data can be received from interface 31 by circuit 41. Although FIG. 4 shows all commands, addresses, and data entering circuit 41 through a common port, different input ports and circuits can also be provided to handle commands and data separately. Logic 41 can also be divided into separate sections (not shown), a command handler for handling commands and/or the associated addresses, and another for handling video data to/from video memory. After receipt from interface 31, video data can be passed by data handling logic in circuit 41 along data path 40 en route to video memory 32. Read data requested from video memory 32 can also travel in the opposite direction along bi-directional data path 40 and be provided to the requestor when such read data transactions are permitted.

Command handling logic in circuit 41 can decode mode or setup commands input into circuit 35. A security mode command can cause line 49 to be set, thereby enabling mode enable gate 46. This in turn enables the security mode, so that any subsequent commands and data will be processed according to the security requirements. Command handling logic in circuit 41 can also accept the upper left and lower right coordinates of a secure window, placing them into upper-left address register 44 and lower-right address register 45, respectively. These can be security registers dedicated to the security function, or can be existing registers that are temporarily designated as security registers. Subsequently, when a read command is received, command decode logic 41 can place the requested read address in register 42, where it can be compared with the two coordinate addresses in registers 44, 45. If the address in the read command falls between the upper-left and lower-right addresses, inclusively, address compare logic 43 can set the line to mode enable gate 46, which can act as a security violation detector. If the other input of mode enable gate 46 is already set (because the circuit is in security mode) then gate 46 can activate the line to data protector 47, triggering a series of steps that respond to the detected security violation by deleting the secure data in the frame buffer and possibly disabling the security mode.

Figure 5:
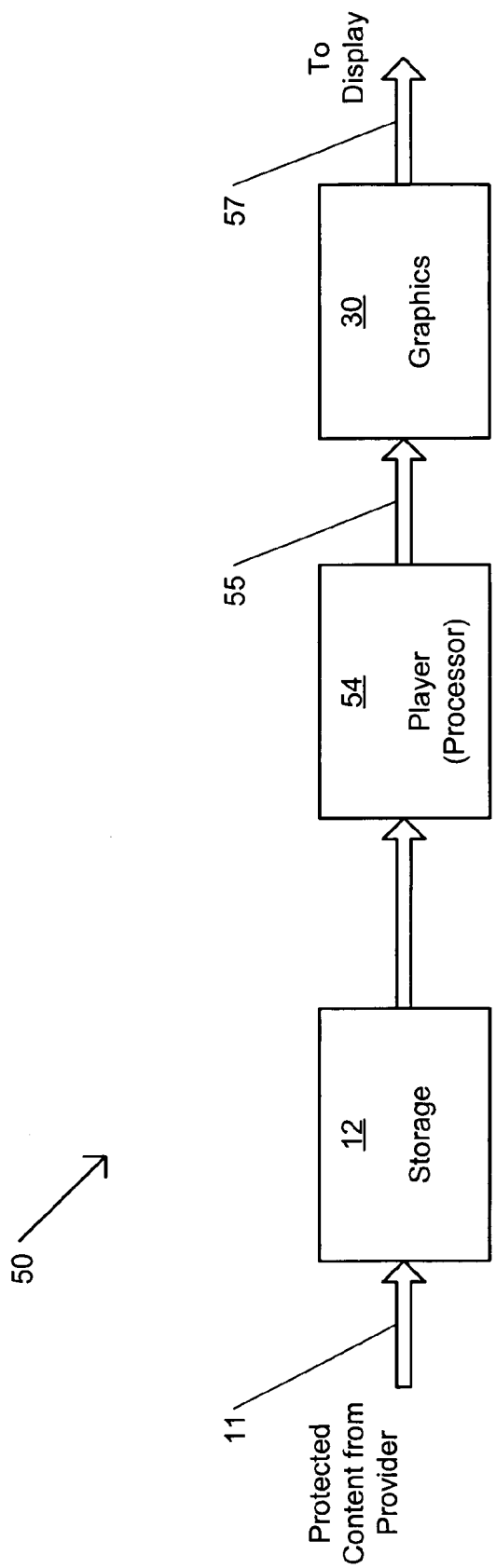
FIG. 5 shows a system of the invention.

FIG. 5 shows a system 50 of the invention. Protected content from a provider can be input through channel 11 and stored in storage medium 12, as in the prior art. The data for presentation can then be passed to player 54, which has the capability to implement the aforementioned security features in graphics controller 30. Channels 55 and 57 can pass the video data to graphics controller 30 and the display, respectively.

The invention can be implemented in circuitry or as a method. The functional steps in the previous paragraphs can be performed with dedicated logic, a state machine, a processor, or any combination of these. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The invention has been described in terms of a frame buffer in a video controller. However, it may be applied to other forms of data presentation. The video controller may be generalized as a presentation controller, which can also take the form of an audio controller that presents downloaded audio information such as music or spoken words. The frame buffer may be generalized as a presentation buffer, which can also take the form of an audio buffer that temporarily stores the audio data to be played, including a combination of protected and non-protected audio data. An embodiment of the invention using audio data can be used to play music or to present an audible e-book for the vision-impaired.

The foregoing description is intended to be illustrative and not limiting. Variations will occur to those of skill in the art. Those variations are intended to be included in the invention, which is limited only by the spirit and scope of the appended claims.

What is claimed is:

1. A method, comprising:
   receiving data in a presentation buffer of a presentation controller, wherein the data in the presentation buffer is in a properly formatted form to be displayed on a display device;
   receiving a request from a requester to read the data in the presentation buffer;
   deleting protected data from the presentation buffer in response to the request; and
   not delivering the protected data to the requestor in response to the request.

2. The method of claim 1, wherein the presentation controller is a graphics controller and the presentation buffer is a frame buffer.

3. The method of claim 1, wherein receiving data includes placing the presentation controller in a security mode.

4. The method of claim 1, wherein deleting protected data includes taking the presentation controller out of a security mode.

5. The method of claim 1, wherein not delivering the protected data includes delivering data other than the protected data requested.

6. A machine-readable medium having stored thereon instructions, which when executed by at least one processor cause said a machine to perform the following operations, comprising:
   receiving data in a presentation buffer of a presentation controller, wherein the data in the presentation buffer is in a properly formatted form to be displayed on a display device;
   receiving a request from a requestor to read the data in the presentation buffer;
   deleting protected data from the presentation buffer in response to the request; and
   not delivering the protected data to the requester in response to the request.

7. The medium of claim 6, wherein the presentation controller is a graphics controller and the presentation buffer is a frame buffer.

8. The medium of claim 6, wherein receiving data includes placing the presentation controller in a security mode.

9. The medium of claim 6, wherein deleting protected data includes taking the presentation controller out of a security mode.

10. The medium of claim 6, wherein not delivering the protected data includes delivering data other than the protected data requested.

11. An apparatus, comprising:
    a presentation controller having:
       a presentation buffer;
       a command handler to process commands and addresses;
       a data handler coupled to the presentation buffer to monitor data and to pass at least a part of the monitored data to the presentation buffer;
       a security violation detector to detect a request by a requestor to read protected data in the presentation buffer; and
       a data protector coupled to the data handler to prevent providing the protected data to the requester, wherein the presentation buffer to supply the at least a part of the monitored data in a properly formatted form to be displayed to a display device.

12. The apparatus of claim 11, wherein the data protector is further to purge the protected data from the presentation buffer upon detection of the request to read protected data.

13. The apparatus of claim 11, wherein the presentation controller is a graphics controller and the presentation buffer is a frame buffer.

14. The apparatus of claim 11, wherein the presentation controller includes a by-pass mode that does not prevent providing the protected data to the requester.

15. The apparatus of claim 14, wherein the data protector:
    is to purge the protected data from the presentation buffer upon detection of the request to read protected data; and
    is to place the presentation controller in the by-pass mode after said purge.

16. The apparatus of claim 11, wherein the data protector is to deliver data other than the protected data requested.

17. A system, comprising:
    a presentation circuit including:
       an input interface to receive data;
       an output port to transmit data in a properly formatted form to be displayed on a display device;
       a presentation buffer coupled to the output port;
       a presentation controller coupled to the presentation buffer and to the input interface and having:
          a command handler to process commands and addresses;
          a data handler to monitor data and to pass at least a part of the monitored data to the presentation buffer;
          a security violation detector to detect a request by a requestor to read protected data in the presentation buffer; and
          a data protector to prevent providing the protected data to the requestor.

18. The system of claim 17, wherein the data protector is further to purge the protected data from the presentation buffer upon detection of the request to read protected data.

19. The system of claim 17, wherein the presentation controller is a graphics controller and the presentation buffer is a frame buffer.

20. The system of claim 17, wherein the presentation controller includes a by-pass mode that does not prevent providing the protected data to the requester.

21. The system of claim 20, wherein the data protector:
    is to purge the protected data from the presentation buffer upon detection of the request to read protected data; and
    is to place the presentation controller in the by-pass mode after said purge.

22. The system of claim 17, wherein the data protector is to deliver data other than the protected data requested.

* * * * *